United States Patent [19]

Williams et al.

[11] Patent Number: 4,969,385

[45] Date of Patent: Nov. 13, 1990

[54] REASSIGNMENT OF DIGITAL OSCILLATORS ACCORDING TO AMPLITUDE

[75] Inventors: Anthony G. Williams; David T. Starkey, both of San Diego, Calif.

[73] Assignee: Gulbransen, Inc., Las Vegas, Nev.

[21] Appl. No.: 462,871

[22] Filed: Dec. 28, 1989

Related U.S. Application Data

[63] Continuation of Ser. No. 145,094, Jan. 19, 1988, abandoned.

[51] Int. Cl.[5] .......................... G01H 1/22; G01H 5/00

[52] U.S. Cl. ................................. 84/656; 84/DIG. 2; 341/26; 341/27; 340/825.5; 307/231

[58] Field of Search ................. 84/618, 656, 684, 742, 84/DIG. 2; 341/20, 22, 26, 27; 340/825.5, 825.51; 307/231; 328/137, 154

[56] References Cited

U.S. PATENT DOCUMENTS

| | | | |
|---|---|---|---|
| Re. 31,931 | 7/1985 | Tomisawa | 84/1.01 |
| 3,610,806 | 10/1971 | Deutsch | 84/1.26 |
| 4,079,650 | 3/1978 | Deutsch et al. | 74/1.26 |
| 4,141,268 | 2/1979 | Kugisawa | 84/DIG. 2 X |
| 4,202,239 | 5/1980 | Southard et al. | 84/1.26 |
| 4,215,619 | 8/1980 | Budelman et al. | 84/1.24 |
| 4,294,155 | 10/1981 | Turner | 84/1.01 |
| 4,333,374 | 6/1982 | Okumura et al. | 84/1.01 |
| 4,387,617 | 6/1983 | Kato et al. | 84/1.01 |
| 4,424,732 | 1/1984 | Imamura et al. | 84/DIG. 2 X |
| 4,433,601 | 2/1984 | Hall et al. | 84/1.03 |
| 4,472,991 | 9/1984 | Kondo | 84/1.01 |
| 4,481,851 | 11/1984 | Swain et al. | 84/1.01 |
| 4,570,520 | 2/1986 | Deutsch et al. | 84/1.01 |
| 4,602,545 | 7/1986 | Starkey | 84/1.01 |
| 4,703,680 | 11/1987 | Wachi et al. | 84/1.26 |
| 4,706,538 | 11/1987 | Yoshida | 84/DIG. 2 X |
| 4,722,259 | 2/1988 | Deutsch et al. | 84/DIG. 2 X |

FOREIGN PATENT DOCUMENTS

| | | | |
|---|---|---|---|
| 2824984 | 1/1979 | Fed. Rep. of Germany | 84/DIG. 2 |
| 0025613 | 2/1977 | Japan | 84/DIG. 2 |

*Primary Examiner*—Stanley J. Witkowski
*Attorney, Agent, or Firm*—J. R. Penrod

[57] ABSTRACT

A method for operating a digital synthesizer type of electronic musical instrument to rapidly make available digital oscillators to produce newly keyed notes even when all digital oscillators are currently active with previous assignments. The method contains a way of maintaining a record of the digital oscillator with the lowest amplitude, and reassigning this lowest amplitude digital oscillator to produce the new note on the rationale that the output of the lowest digital oscillator will be the least missed if an output has to be prematurely curtailed. Beside just a straight amplitude critereon, the method also allows for prioritizing some low amplitude outputs over others to make a more pleasing performance. The invention also includes an apparatus for performing the method.

5 Claims, 8 Drawing Sheets

OSCILLATOR DATA STRUCTURE #M

ENVELOPE STATUS
LOGICAL WAVETABLE
AMPLITUDE POINTER
UNRESOLVED NOTE
RESOLVED NOTE
SOURCE
GROUP POINTER
SOUND FILE POINTER
PRIORITY
ATTACK SEQUENCE

REASSIGNMENT OF DIGITAL OSCILLATORS ACCORDING TO AMPLITUDE

This is a continuation of application Ser. No. 145,094, filed on Jan. 19, 1988, and now abandoned.

BACKGROUND OF THE INVENTION

The invention concerns an electronic musical instrument, and more particularly a method and apparatus for controlling the manner of music synthesis by such an instrument to obtain a more pleasurable music performance.

Electronic musical instruments that synthesize music belong to one of two categories. The first category encompasses those musical instruments which produce a musical tone output from at least one continuous input that is acted upon by a substantially linear transfer network. These instruments are referred to as analog synthesizers because the music output is analogous to the continuous input when the transfer function of the transfer network is taken into account. The second category encompasses those musical instruments which produce a musical tone output from a sequence of discrete samples of varying amplitudes as an input that is acted upon by a scaling network and by a digital to analog convertor. These instruments are referred to as digital synthesizers because the music output is a reconstruction of an input of a sequence of digital numbers representing the discrete samples of varying amplitudes when the action of the scaling networks and the digital to analog convertors are taken into account. An example of the latter is shown in U. S. Pat. No. 4,602,545 by David Starkey, which is hereby incorporated by reference.

This distinction is important because both categories of synthesizers may be controlled digitally using a microprocessor.

Both categories typically are required to play one or more new notes when all of the note synthesizing assets are currently active. This occurs when the number of new notes to be played by the synthesizer and the number of previous notes or portion thereof still being played as part of an initially predetermined duration exceeds the total number of note sythesizing assets. In sophisticated electronic musical instruments, for example those including electronic effects such as automatic accompaniment and complex instrument voices such as guitar; how to provide synthesizing assets for a new tone when all sythesizing assets are currently active generating previously assigned tones or portions thereof is a significant and difficult design problem. Delaying the production of new tones until sythesizing assets are available may change the rhythm and be objectionable, while removing currently active sythesizing assets in order to reassign them to the production of the new tone or portion thereof may also be objectionable.

Analog synthesizers take advantage of the predetermined continuous way that the envelope of each tone is shaped as an indicator of which note to remove and reassign its channel to a new note. The envelope of the notes has a predetermined shape defined for many instruments, such as percusion instruments, as attack, sustain, and decay until the key defining the note is released. After release, the envelope is quickly dampened to terminate any further tone production. Various methods for removing a currently active tone generator and reassigning it to the production of a new note have used some of the predetermined attributes of the note envelope.

U. S. Pat. No. 4,481,851 by Swain et al. discloses an electronic musical instrument which assigns the notes corresponding to newly depressed keys to the note generators which have the greatest amounts of time in the release portion of their envelopes. This is described in column 5 in lines 20 et seq. An obJectionable problem occurs if all of the note generators are active and not in a release status. As described in column 9 lines 24 et seq., in such a case the instruction to produce a new note is stored, i.e. delayed, until at least one note generator is in a release status.

U.S. Pat. No. 4,570,520 by Deutsch et al. discloses an electronic musical instrument which maintains a data record of how long each tone generator has been active with its current assignment. If a new key is depressed while all tone generators are currently active, then the tone generator that has been active on its current assignment the longest is reassigned to produce the tone corresponding to the newly depressed key. This method can be objectionable because it does not discriminate between musically important long notes such as bass tones, on the one hand, and less important tones which are not as prominent in the musical performance. This method is detailed at column 5 in lines 11 through 38.

U. S. Pat. No. 4,703,680 by Wachi et al. discloses an electronic musical instrument which truncates the tone which has the greatest amount of decay as described in column 6 lines 48 et seq. This instrument also has a provision for weighting the decay of the notes as a function of frequency, as well as, very simply prioritizing the lowest note in order to overcome one of the problems of removing musically important notes. This system suffers from the problem inherent in the design of analog system in that the note generator produces the entire sound for its respective note, and if it is the most important but most decayed upper note or the second most important and most decayed bass note, then it still will be completely removed leaving an objectionable void in the musical performance.

U. S. Pat No. 4,202,239 by Southard discloses an electronic musical instrument having two embodiments. The digital controlled analog synthesizer embodiment maintains a record of the oldest released note as described in column 10 lines 35 et seq. The analog controlled analog synthesizer embodiment compares the analog output of the top octave tone synthesizer with the output of a staircase voltage generator set at a level which is below the sustain level of the note envelope. This analog controlled embodiment removes and reassigns the note synthesizer which has the least voltage remaining out of its envelope keyer circuit (see column 20 lines 20 et seq.). This instrument suffers from the same problem as the other analog synthesizes previously mentioned in that it must remove an entire note in order to reassign the note synthesizer. Furthermore, in the Circumstances described at column 18 line 18 et seq., this known design will fail to sound a newly played note in favor of the notes currently active which may be very objectionable to those listening to the musical performance. Moreover, the analog measuring method for determining which tone generator to reassign simply takes too much time to be used in a digitally controlled system such as its own alternate embodiment.

Additional patents of interest are U. S. Pat. Nos. RE 31,931; 4,472,991; 4,387,617; 4,079,650; and 3,610,806.

SUMMARY OF THE INVENTION

Briefly stated, in accordance with one aspect of the invention, there is provided, in an electronic musical instrument of the wavetable type having a plurality of digital oscillators, a method for assigning one of the plurality of digital oscillators including the steps of sampling a plurality of keys to determine if one of the plurality of keys has been newly depressed, associating with each newly depressed key a respective set of wavetable data, determining a first number of digital oscillators of the plurality of digital oscillators required to process the set of wavetable data, and determining if the first number of digital oscillators required to process the set of wavetable data exceeds a second number of digital oscillators not currently active. If the first number of digital oscillators does not exceed the second number of digital oscillators, then the method assigns the set of waveform data to the first number of not currently active digital oscillators to process the set of wavetable data and returns to the step of sampling for a newly depressed key. If the first number of digital oscillators exceeds the second number of digital oscillators, the method continues by searching the digital oscillators currently active for the digital oscillator with the lowest amplitude parameter, changing the status of the digital oscillator with the lowest amplitude parameter to not currently active and returning to method step wherein the determination is made if the first number of digital oscillators exceeds the second number of digital oscillators.

In another aspect of the invention, there is provided in an electronic musical instrument of the wavetable type having a plurality of digital oscillators, a method for assigning one of the plurality of digital oscillators including the steps of sampling a plurality of keys to determine if one of the plurality of keys has been newly depressed, associating with each newly depressed key a respective set of wavetable data having a plurality of portions, determining a first number of digital oscillators of the plurality of digital oscillators required to process the plurality of portions of wavetable data, and determining if the first number of digital oscillators required to process the set of wavetable data exceeds a second number of digital oscillators not currently active. If the first number of digital oscillators does not exceed the second number of digital oscillators, then each portion of the waveform data is assigned to a respective one of the not currently active digital oscillators to process the set of wavetable data and the method returns to the step of sampling for a newly depressed key. If the first number of digital oscillators exceeds the second number of digital oscillators, then the method searches the digital oscillators currently active for a digital oscillator having a lowest amplitude parameter, changes the status of the digital oscillator having the lowest amplitude parameter to the not currently active status, assigns one of the unassigned portions of the plurality of portions of the set of wavetable data to the not currently active digital oscillator, and subsequently reduces the first number of digital oscillators by one. A determination is made at this point if the first number of digital oscillators is greater than zero and if it is, the method returns to the step of determing if the first number of digital oscillators, after reduction by one, exceeds the second number of digital oscillators which are currently inactive.

In another aspect of the invention, there is provided an apparatus for reassigning digital oscillators according to amplitude.

In another aspect of the invention, there is provided an apparatus for reassigning a digital oscillator according to amplitude to produce a portion of a musical note.

It is an object of this invention to provide in an electronic musical instrument of the digital synthesizer type, a method by which the digital oscillators required to process a newly selected note are always provided.

It is another object of this invention to provide in an electronic musical instrument of the digital synthesizer type a method by which the digital oscillators required to process a newly selected note are provided from those digital oscillators having the lowest amplitude among those which are least musically significant.

It is a further object of this invention to provide in an electronic musical instrument of the digital synthesizer type, a method by which tones are comprised of two or more portions and when a digital oscillator is reassigned, it is possible to remove only a musically less significant portion of a tone and continue the processing of the more musically significant portion or portions.

It is a further object of this invention to provide in an electronic musical instrument of the digital synthesizer type, a method by which the tones may be grouped by source as an indicator of musical significance.

BRIEF DESCRIPTION OF THE DRAWINGS

While the specification concludes with claims specifically pointing out and distinctly claiming the subject matter which is considered to be the invention, it is believed that the invention may be better understood when taken in conjunction with the following drawings in which:

DETAILED DESCRIPTION

Figure 1:
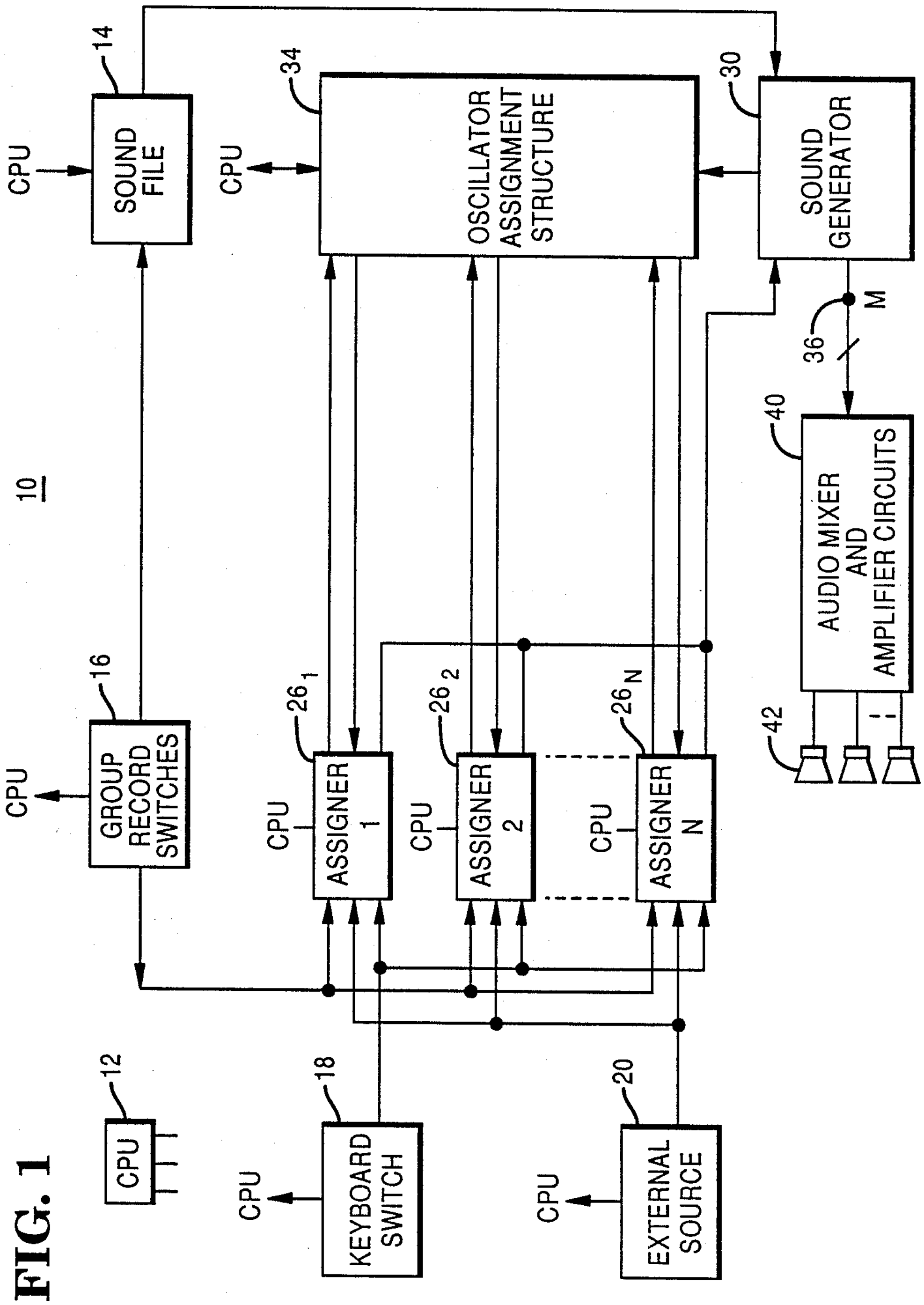
FIG. 1 is a block diagram showing the note selection and production portions of the electronic musical instrument.

Referring now to FIG. 1, an electronic musical instrument 10 is shown. The electronic musical instrument 10 is of the digital synthesizer type as is the instrument known from U. S. Pat. No. 4,602,545 mentioned previously. Digital synthesizers typical use a central processing unit (CPU) 12 to control the functional blocks to produce the desired music output, in some ways similar to the manner that CPU's are used in analog synthesizer instruments. In digital synthesizers, however, the CPU's perform the additional tasks related to digital synthesis of musical tones. Thus CPU 12 is not only controlling the functional components to produce the musical sound output, it is also controlling the movement and processing of stored data which is transformed eventually into the played music, as will be explained below.

Digital data, which can be transformed by digital synthesis is stored in a sound file 14. The sound file 14 may be any of various types of memory devices, such as a ROM that is fixedly programmed or a RAM which is down-loaded from some other memory such as a disk. The sound file 14 contains the wavetables which are sets of data from which all of the musical tones are synthesized. Which of the wavetables, within sound file 14, is selected to provide a respective musical note depends upon a number of input parameters. Group record switches 16, when actuated, select the type of voice that the music will have. These switches 16 are similar to the stop switches on an organ. These switches 16 provide one data input into the selection of which wavetables to process, and in what combinations in order to provide the harmonic content and the envelope shape of the ultimate audio signal corresponding to the selected voice.

A second input, for determining the ultimate audio signal of the instrument, are the note or notes are played on the keyboard 18. Keyboard 18, as is known in the art, has a plurality of switches which are periodically sampled by CPU 12 to determine if the status of a keyswitch or key is newly depressed, held down, or released. For the most part, the exceptions will be addressed later, the status of each key of keyboard 18 and the status of the group record switches 16 along with the predetermined information in the wavetables of sound file 14 determine the ultimate audio signal which is produced by the electronic musical instrument 10.

Another input can be provided by an external source 20. The external source can be an auxiliary keyboard or an accompanying electronic musical instrument which interfaces with the circuitry and processes of the electronic musical instrument 10. The input from external source will be treated the same as the input from keyboard 18, but each input will have a data identifier in order that the source of each input note may be identified when more than one source is used. This allows for notes to be processed differently according to source, should there be a need, in order to provide a more pleasing performance.

The inputs from the group record switches 16, the keyboard 18, and the external source 20 are interconnected to a plurality of assigners 26. The assigners 26 determine, from their inputs and from a predetermined process, the number and composition of the tones that are required to be produced by the inputs received. The predetermined process may be stored in ROM within the assigner 26, downloaded from another memory into RAM, or a combination of both. When active, each assigner 26 is associated with at least one of the M digital oscillators within a sound generator 30. Digital oscillators, such as the one shown in FIG. 3 of U. S. Pat. No. 4,602,545, and their operation are known in the art and, therefor, will not be further described here.

The association and interconnection between one of the assigners 26 and one or more of the digital oscillators of sound generator 30 is a logical association and interconnection under the control of the CPU 12 and an oscillator assignment structure (OAS) 34. The OAS 34 is a data file structure maintained in RAM which is used by the assigners 26 to control the digital oscillators in the sound generator 30.

Figures 2, 3:
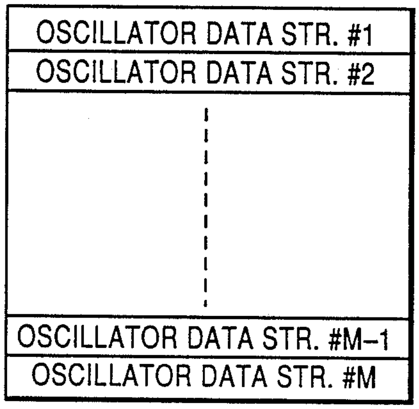
FIG. 2 is a functional block diagram of the Oscillators assignment Structure.
FIG. 3 is a diagram illustrating the nature of the data maintained within the Oscillator Assignment Structure.

Referring now to FIG. 2, an arrangement of individual oscillator data structures is shown. There are M oscillator data structures, one for each of the M digital oscillators. In a preferred embodiment of the invention, the normal value for M is sixty-four, but under predetermined circumstances that may be increased, and other values of M are contemplated by this invention. A content of each individual oscillator data structure is shown in FIG. 3. Each oscillator data structure contains data words encoding bits of information which are used by the respective assigner to control its respective digital oscillator. Additions or deletions may be made to this data structure in order to perform the tasks predetermined for processing the inputs from switches 16, keys 18, and source 20; and the wavetable information from sound file 14 in sound generator 30 (see FIG. 1).

Referring back to FIG. 1, it is important to recognise that the wavetable frequency sample information supplied to each respective digital oscillator is normalized to an average value so there are no truncation and overflow problems. Thus, each of the outputs 36 of the digital oscillators would be substantially equivalent to the other outputs 36 except for the envelope and amplitude stages of the sound generator 30. The sound file 14 predetermines an envelope shape and amplitude of each respective digital oscillator that is active. The shape and amplitude is also a function of the group record switches 16, the status of the depressed key (newly depressed, held, or released) on keyboard 18 or source 20, and length of the current key status. Since the tonal waves start substantially at the same normalized level, that level is taken to be the loudest permitted sound that can be generated. Any amplitude change, by the envelope shaping, is actually an attenuation according to an amplitude mutiplying factor during the period of each wavetable segment. Thus, both envelope and loudness are determined by the attenuation set by an amplitude factor.

The outputs 36 are connected to an audio mixer and amplifier circuit 40, such as the one known from U.S. Pat. No. 4,602,545 mentioned previously, for mixing and amplifying the various digital oscillator outputs 36. The audio mixer and amplifier circuit 40 is further connected to loudspeakers 42. The loudspeakers 42 are placed to provide a pleasing and natural sound from the electrical outputs from the audio mixer and amplifier 40.

As can be appreciated, during operation, some the notes corresponding to a depressed key and a selected voice can require a very large number of digital oscillators for a considerable length of time. If many such notes are selected, from either the keyboard 18 or the source 20, then soon all of the digital oscillators will be active and there will not be any digital oscillators currently available to process the wavetable information corresponding to a newly depressed key. Under such circumstances, some process of finding and reassigning the digital oscillators that would be noticed the least aurally is necessary to provide a pleasing and natural musical performance.

Figure 4:
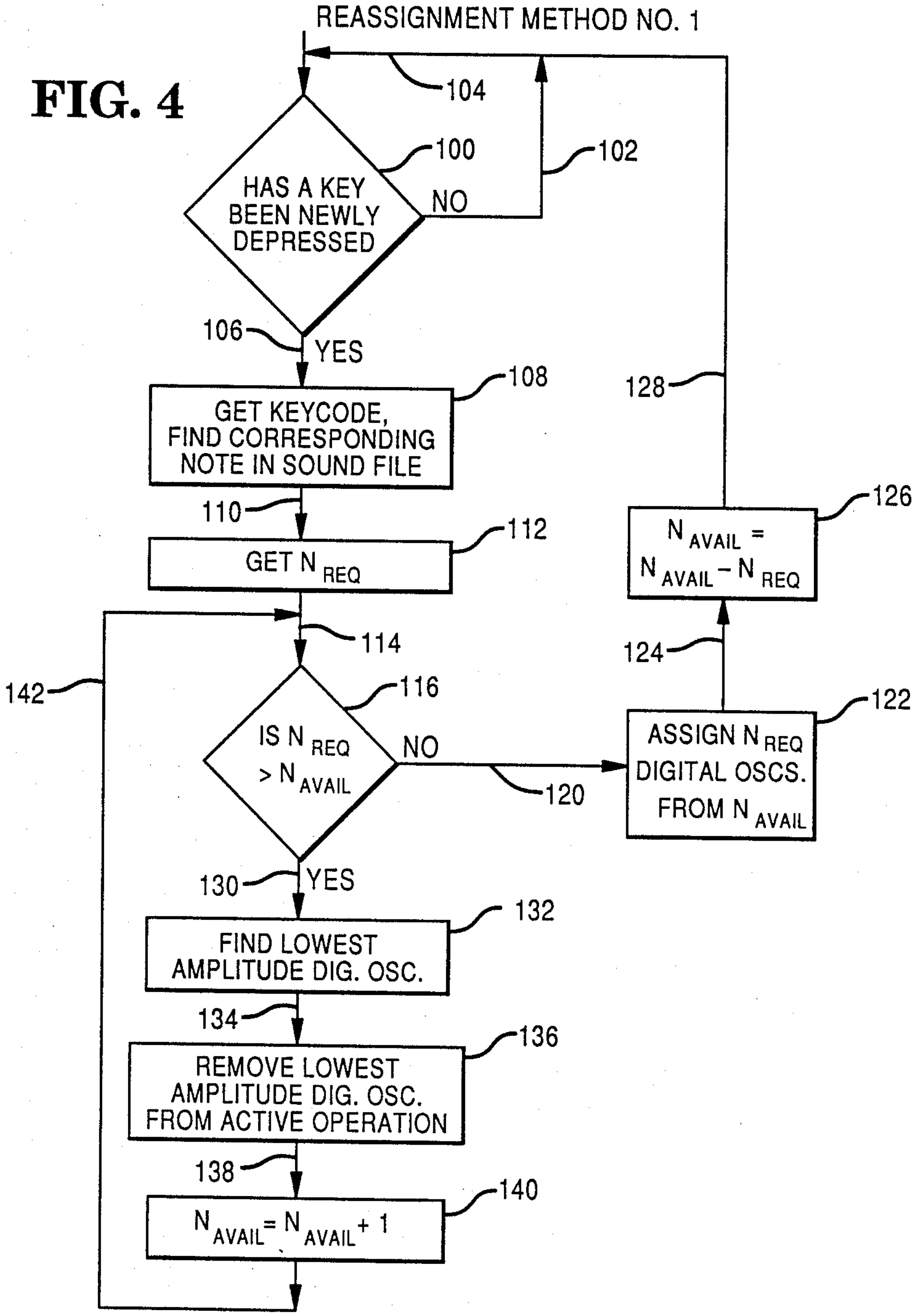
FIG. 4 is a logic diagram illustrating the logical operations of a first embodiment of the invention.

One method of reassigning digital oscillators is illustrated in FIG. 4, which is a logic flow diagram. The action at location 100 samples the keyboard 18 and the source 20 to determine if a key has been newly depressed. If a key has not been newly depressed, then the method branches back along path 102,104 to the beginning at the action at location 100 again. If a key has been newly depressed then the method branches along path 106 to the action at 108. The action at 108 gets the key code associated with the depressed key, and from the keycode finds the corresponding note information in the corresponding sound file. From the method continues along path 110 to the action at 112. The action at 112 gets the number of digital oscillators N REQ required to process the note corresponding to the newly depressed key, and continues along path 114 to the action at 116. The action at 116 determines if the number of digital oscillators N REQ required is greater than the number of digital oscillators N AVAIL available because they are not currently active. If the number of digital oscillators required is not greater than the number of digital oscillators available, then the method branches along path 120 to the action at 122. The action at 128 assigns the N REQ of the N AVAIL digital oscillators to the processing of the new note and continues along path 124 to the action at 126. The action at 126 reduces the number of available digital oscillators by the number of digital oscillators required to process the new note and stores that value in memory ( for simplicity, this method does not address the case of a digital oscillator becoming available because its tone is finished although it is a straightforward variation of the present invention). After storing the new value of N AVAIL the method follows path 128,104 and starts over again.

If, however, more digital oscillators are required to process the new note than are currently available, then the method follows path 130 to the action at 132. The action at 132 searches the OAS for the lowest amplitude (i. e. the greatest amount of attenuation) digital oscillator output and then follow the path 134 to the action at 136. The action at 136 removes the lowest amplitude digital oscillator from active operation by rapidly dampening any remaining output level and reassigning that digital oscillator to the number which are currently available. The method then follows path 138 to the action at 140 where the number N AVAIL is increased by one and the method returns along path 142,114 to the action at 116. Those skilled in the art will recognise that the method will repeat the actions at 116, 132, 136, and 140 until enough of the lowest amplitude digital oscillators have been removed from currently active status to provide the required digital oscillators to process the new note, i.e. the method will be at location 122. At that point the new note will be processed and the method can return along path 124 to action 126 and from there along path 128, 104 to the beginning.

Figure 5A:
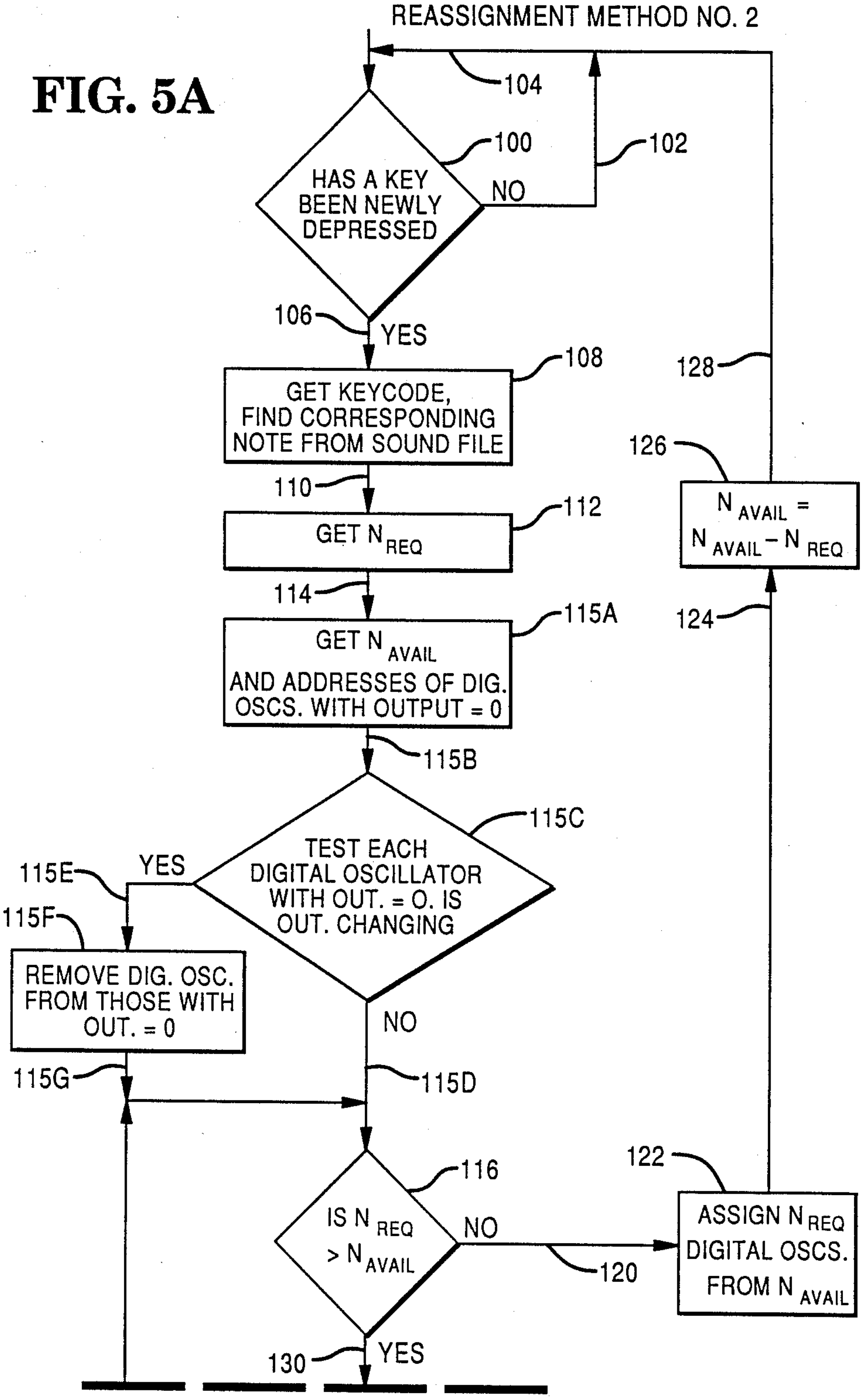
FIGS. 5A and 5B when joined along the dashed lines form a logic diagram illustrating the logical operations of a second embodiment of the invention.
Figure 5B:
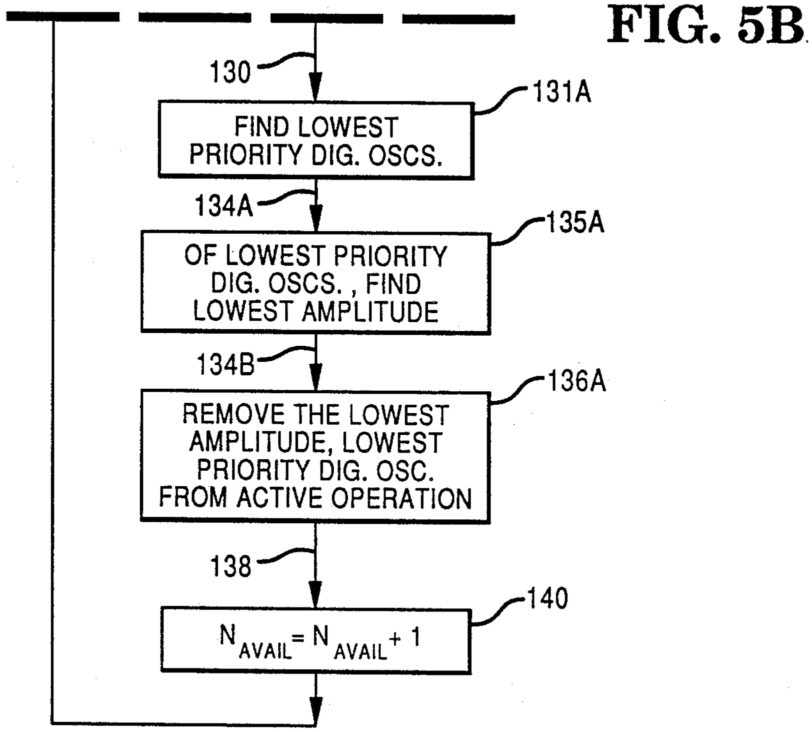

A second method of reassigning digital oscillators is illustrated in FIGS. 5A and 5B which is a logic flow diagram. The action at location 100 samples the keyboard 18 and the source 20 to determine if a key has been newly depressed. If a key has not been newly depressed then the method branches back along path I02,l04 to the beginning at the action at location 100 again. If a key has been newly depressed, then the method branches along path 106 to the action at 108. The action at 108 gets the key code associated with the depressed key, and from the keycode finds the corresponding note information in the corresponding sound file. From 108, the method continues along path 110 to the action at 112. The action at 112 gets the number of digital oscillators N REQ required to process the note corresponding to the newly depressed key, and continues along path 114 to the action at 115A. The action at 115A gets the number of and addresses of every digital oscillator which is equal to zero from the sound file and continues along the path 115B to the action at 115C. In the action at 115C, the OAS of each digital oscillator that has an output amplitude which is equal to zero is tested to see if the data indicates that the output of any oscillator is changing from zero in the next data sample. If the outputs of any digital oscillator having an output amplitude which is currently zero is changing from zero, then the method branches along the path 115E to the action at 115F. The action at 115F removes that digital oscillator and its addresses from consideration for reassignment and the method follows the path 115G to the action at 116, which will be discussed below. If, however, the result of the action at 115C is that all of the digital oscillators which are currently at zero amplitude are not changing in the next data sample, then the method continues along path 115D to the action at 116.

The action at 116 determines if the number of digital oscillators N REQ required is greater than the number of digital oscillators N AVAIL available because they are not currently active. If the number of digital oscillators required is not greater than the number of digital oscillators available, then the method branches along path 120 to the action at 122. The action at 128 assigns the N REQ of the N AVAIL digital oscillators to the processing of the new note and continues along path 124 to the action at 126. The action at 126 reduces the number of available digital oscillators by the number of digital oscillators required to process the new note and stores that value in memory. After storing the new value of N AVAIL the method follows path 128, 104 and starts over again.

If, however, more digital oscillators are required to process the new note than are currently available, then the method follows path 130 to the action at 131A. The action at 131A finds the digital oscillators which in their OAS structures have the lowest (i.e. least) priority. The predetermined priority assigns the lowest priority to those notes which are in the release stage of their envelopes. The next lowest priority is assigned to those notes which are in the decay stage of their envelopes. If further digital oscillators are needed, the highest predetermined priority for reassignment are those notes which are in the attack stage of their envelopes. It is worth noting though, that because the priority is an entry the OAS, these predetermined priorities can be dynamically re-ordered if there is a musical nced. After these digital oscillators have been located, then the method follows the path 134A to the action at 135A where the digital oscillator having the lowest amplitude of all the digital oscillators having the lowest priority is found. Then the method follows the path 134B to the action at 136A where the lowest amplitude, lowest priority digital oscillator is removed from current activity and made available for reassignment. At this point, the remaining paths and actions are the same as those of the method shown in FIG. 4 and discussed previously.

Figure 6:
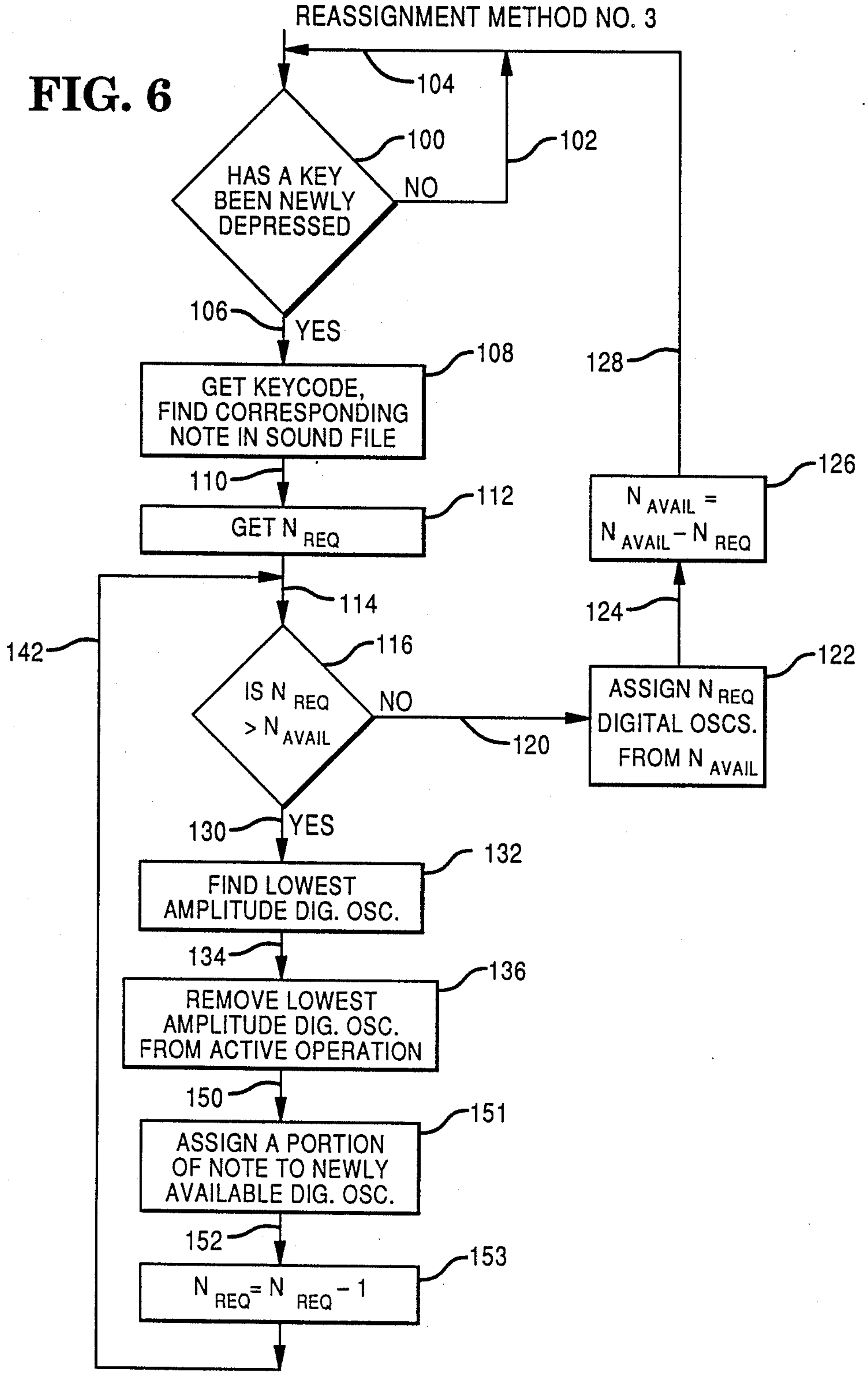
FIG. 6 is a logic diagram illustrating the logical operations of a third embodiment of the invention.

Referring now to FIG. 6, a third method is shown in a logic flow diagram. This method is very similar to the method of FIG. 4 except that the path 138 and the action 140 have been replaced by the paths 150, 152 and the actions 151, 153. This third method, after the action 136 of removing the lowest amplitude digital oscillator from active operation, continues along path 150 to the action at 151. The action at 151 assigns one of the portions, which make up the complex newly played note, to the digital oscillator that was made available in the previous action 136 and then follow the path 152 to the action at 153. The action at 153 reduces the number N REQ of digital oscillators required to process the new note by one since one portion of it has just been assigned in the action at 151. At this point on path 142, the remainder of method three again becomes the same as method one.

Method three allows the digital oscillators to be reassigned one al a time to process the respective portions of a newly played note. If reassigned rapidly enough (i.e. in microseconds) the sequential superposition of the new note portions will not be noticable to the listener.

Figure 7A:
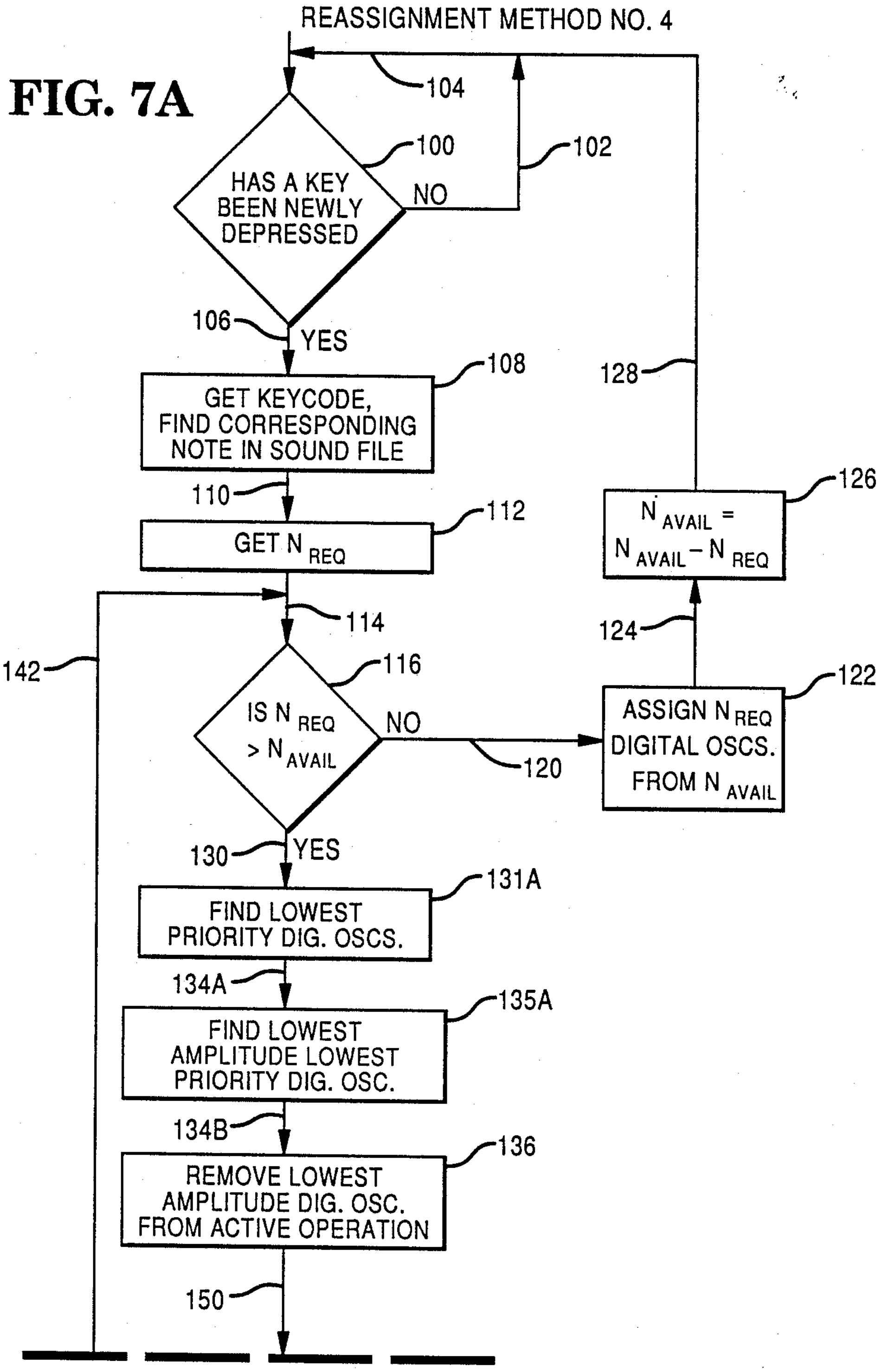
FIGS. 7A and 7B when joined along the dashed lines form a logic diagram illustrating the logical operations of a fourth embodiment of the invention.
Figure 7B:
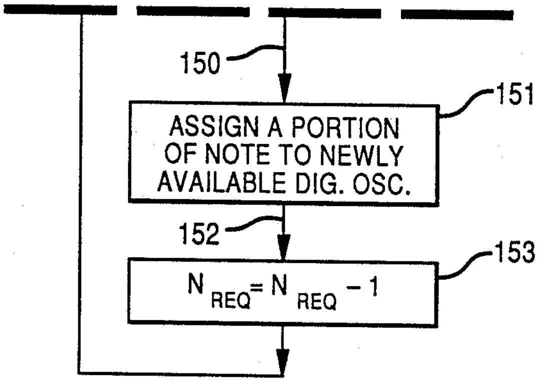

Referring now to FIG. 7A and 7B, a fourth method is shown in a logic flow diagram. This method is very similar to method three, except that between the action 116 and the action 136, two paths 134A, 134B and two actions 131A, 135A have been added. Starting at action 131A, method four finds the lowest priority digital oscillators and then follows path 134A to the action at 135A. The action at 135A finds the lowest amplitude digital oscillator from the lowest priority digital oscillators and then follows path 134B to the action at 136. From this point onward, method four is the same as method three described above. These addition actions give method four all the advantages of method three, plus it has the additional advantage of prioritizing portions of the currently active notes according to musical importance. With method four, the most subtle portion of each complex note could be assigned the lowest priority and when a large number of notes are played in sequence, the subtle portion will be taken away to process new notes, but because of all the notes being played, the loss of the subtle portion will not be very noticable to the listener.

Thus, there has been disclosed a new electronic musical instrument of the digital synthesize type which has a new method of reassigning digital oscillators to process newly depressed note. It is contemplated that other variations and modifications of the method and apparatus of applicant's invention will occur to those skilled in the art. All such variations which fall within the spirit and scope of the appended claims are deemed to be part of the present invention.

We claim:

1. In an electronic musical instrument of the wavetable type having a first plurality of digital oscillators, a method for assigning a second plurality of digital oscillators which is less than said first plurality of digital oscillators to provide a musical tone, comprising the steps of:

a. sampling a plurality of keys to determine if one of the plurality of keys has been newly depressed;
b. associating with each newly depressed key a respective set of wavetable data;
c. determining a magnitude of said second plurality of digital oscillators required to process the set of wavetable data;
d. determining if said second plurality of digital oscillators required to process the set of wavetable data exceeds a number of digital oscillators not currently active;
e. if said second plurality of digital oscillators does not exceed the number of digital oscillators not currently active, assigning the set of wavetable data to said second plurality of digital oscillators from the number of not currently active digital oscillators to process the set of wavetable data into a sequence of digital data associated with the newly depressed key, which is converted by a digital to analog converter into an analog signal which is transduced by a loudspeaker into a musical tone corresponding to said newly depressed note, and the method is completed, otherwise proceeding to a next step;
f. searching the digital oscillators currently active for the digital oscillators with the lowest amplitude parameter; and
g. changing an operating status of the digital oscillator with the lowest amplitude parameter to not currently active and returning to step d.

2. In an electronic musical instrument of the wavetable type having a first plurality of digital oscillators, a method for assigning a second plurality of digital oscillators which is less than said first plurality of digital oscillators to provide a musical tone, comprising the steps of:

a. sampling a plurality of keys to determine if one of the plurality of keys has been newly depressed;
b. associating with each newly depressed key a respective set of wavetable data;
c. determining a magnitude of said second plurality of digital oscillators required to process the set of wavetable data;
d. determining if said second plurality of digital oscillators required to process the set of wavetable data exceeds a number of digital oscillators not currently active;
e. if said second plurality of digital oscillators does not exceed the number of digital oscillators not currently active, assigning the set of wavetable data to said second plurality of digital oscillators from the number of not currently active digital oscillators to process the set of wavetable data into a sequence of digital data associated with the newly depressed key, which is converted by a digital to analog converter into an analog signal which is transduced by a loudspeaker into a musical tone corresponding to said newly depressed note, and the method is completed, otherwise proceeding to a next step;
f. searching all digital oscillators currently active for a number of digital oscillators having a lowest priority;
g. searching the number of digital oscillators having the lowest priority and that are currently active for one digital oscillator with a lowest amplitude parameter; and
h. changing an operating status of the digital oscillator having the lowest priority that is currently active with the lowest amplitude to not currently active and returning to step d.

3. In an electronic musical instrument of the wavetable type having a first plurality of digital oscillators, a method for assigning a second plurality of digital oscillators which is less than said first plurality of digital oscillators to provide a musical tone, comprising the steps of:

a. sampling a plurality of keys to determine if one of the plurality of keys has been newly depressed;
b. associating with each newly depressed key a respective set of wavetable data having a plurality of portions;
c. determining a magnitude of said second plurality of digital oscillators required to process the plurality of portions of wavetable data;
d. determining if said second plurality of digital oscillators required to process the set of wavetable data exceeds a number of digital oscillators not currently active;

e. if said second plurality of digital oscillators does not exceed the number of digital oscillators not currently active assigning each portion of the wavetable data to said second plurality of digital oscillators from the number of not currently active digital oscillators to process the set of wavetable data into a sequence of digital data associated with the newly depressed key, which is converted by a digital to analog converter into an analog signal which is transduced by a loudspeaker into a musical tone corresponding to said newly depressed note, and the method is completed, otherwise proceeding to a next step;

f. searching all digital oscillators currently active for a number of digital oscillators having a lowest amplitude parameter;

g. changing an operating status of the digital oscillator with the lowest amplitude parameter to not currently active status;

h. assigning one of the assigned portions of the plurality of portions of the set of wavetable data to the not currently active status digital oscillator; and i. reducing the number of digital oscillators required to process the wavetable data by one and if the number of digital oscillators exceeds zero then return to step e.

4. In an electronic musical instrument of the wavetable type having a first plurality of digital oscillators, a method for assigning a second plurality of digital oscillators which is less than said first plurality of digital oscillators, to provide a musical tone comprising the steps of:

a. sampling a plurality of keys to determine if one of the plurality of keys has been newly depressed;

b. associating with each newly depressed key a respective set of wavetable data having a plurality of portions;

c. determining a magnitude of said second plurality of digital oscillators required to process the plurality of portions of wavetable data;

d. determining if said second plurality of digital oscillators required to process the set of wavetable data exceeds a number of digital oscillators not currently active;

e. if said second plurality of digital oscillators does not exceed the number of digital oscillators not currently active, assigning each portion of the wavetable data to said second plurality of digital oscillators from of the not currently active digital oscillators to process the set of wavetable data into a sequence of digital data associated with the newly depressed key, which is converted by a digital to analog converter into an analog signal which is transduced by a loudspeaker into a musical tone corresponding to said newly depressed note, and the method is completed, otherwise proceeding to a next step;

f. searching the digital oscillators currently active for at least one digital oscillator having a lowest priority;

g. searching among the lowest priority digital oscillators currently active for one having lowest amplitude parameter;

h. changing the lowest priority digital oscillator having the lowest amplitude parameter to not currently active status;

i. assigning one of the plurality of portions which is not currently assigned to a not currently active digital oscillator; and j. reducing the number of digital oscillators required to process the plurality of portions of the wavetable data by one and if the number of digital oscillators required to process the plurality of portions of the wavetable data exceeds zero then returning to step e.

5. In an electronic musical instrument of the wavetable type having a first plurality of digital oscillators, a device for assigning a second plurality of digital oscillators which is less than said first plurality, comprising:

a. means for sampling a plurality of keys to determine if one of the plurality of keys has been newly depressed; p'b. means for associating with each newly depressed key a respective set of wavetable data;

c. means for determining a number of digital oscillators of the second plurality of digital oscillators required to process the set of wavetable data;

d. means for determining if the number of digital oscillators required to process the set of wavetable data exceeds a number of digital oscillators which are not currently active;

e. means for assigning the set of wavetable data to the number of not currently active digital oscillators to process the set of wavetable data if the number of digital oscillators does not exceed the number of digital oscillators not currently active;

f. means for searching the digital oscillators currently active for a number of digital oscillators which is equal to an amount that the number of digital oscillators required to process the set of wavetable data exceeds the number of digital oscillators which are not currently active, having the lowest amplitude parameters;

g. means for changing the status of the digital oscillators having the lowest amplitude parameters to not currently active thereby providing sufficient not currently active digital oscillators for producing a new note corresponding to the newly depressed key;

h. digital to analog converter means connected to said second plurality of digital oscillators for converting the set of wavetable data into an time varying signal; and i. loudspeaker means for transducing the time varying signal into a sound of the new note corresponding to the newly depressed key.

* * * * *